March 3, 1959  B. W. TAYLOR  2,876,175
FRACTIONAL DISTILLATION APPARATUS
Filed April 21, 1954

INVENTOR.
Billy W. Taylor
BY
HIS ATTORNEYS

United States Patent Office 2,876,175
Patented Mar. 3, 1959

2,876,175

FRACTIONAL DISTILLATION APPARATUS

Billy W. Taylor, Pittsburgh, Pa., assignor to Fisher Scientific Company, Pittsburgh, Pa., a corporation of Pennsylvania Application April 21, 1954, Serial No. 424,557

4 Claims. (Cl. 202—158)

This application relates to fractional distillation apparatus, more specifically, apparatus used for the separation by distillation of materials having very close boiling points. It is also useful for the distillation in vacuo of materials in small quantities.

In any fractional distillation procedure, it is important that temperatures within the apparatus be closely controlled. Where the apparatus is used to separate materials having very close boiling points, a very close control of temperatures is essential. Not only must the temperature be controlled, but an adiabatic condition must be maintained throughout the entire portion of the apparatus in which the separation takes place. Heretofore, this has been a very difficult problem because even in the best laboratory conditions, air currents will affect the control and maintenance of a particular temperature.

In fractional distillation procedures, it is also important that all of the condensation of the materials being separated occur adjacent one point in the apparatus, which point is a small part of the entire apparatus, so that all of the material which is condensed in the apparatus can be readily collected and transferred to a take-off device. If condensation does not take place in a relatively small portion of the apparatus, it is difficult to recover the distillate and, as a consequence, a much longer time is required to complete separation of any particular materials. Specifically, the distillate should condense only on a "cold finger" which extends down into the upper portion of a fractionating column of conventional distillation apparatus. My improved distillation apparatus prevents condensation of the distillate within the apparatus at all points except the cold finger.

In the accompanying drawings, I have illustrated a present preferred embodiment of my invention, wherein.

Figure 1:
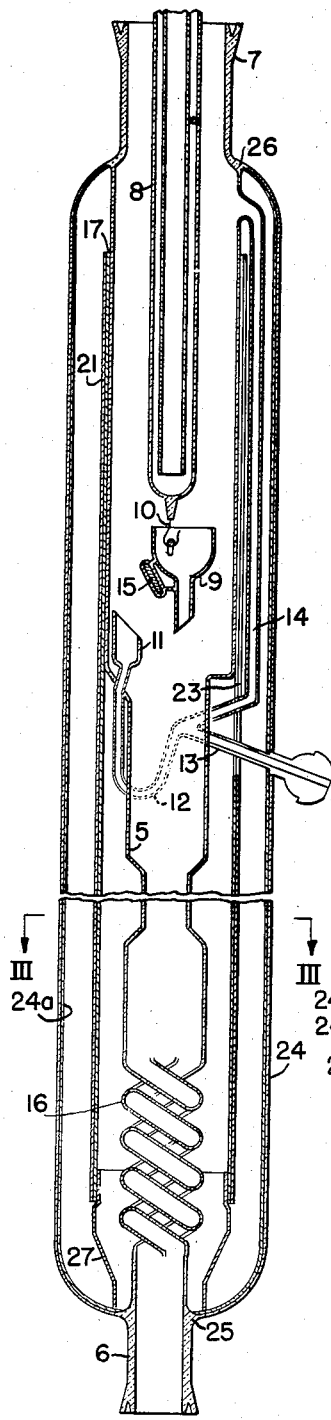
Figure 1 is a central vertical section of my distillation apparatus.

Distillation apparatus embodying my invention comprises a central fractionating column 5 having at one end a flanged joint 6 by which it may be connected to a conventional heating flask (not shown) wherein the materials to be separated are heated to the proper temperature for vaporization. The other end of the column 5 has a second flanged joint 7 whereby a conventional condensing unit may be connected to the column. Such a unit has a cold finger, a portion of which is shown at 8 in Figures 1 and 2, which extends from the flange 7 down into the fractionating column 5 for a portion of the length of that column. At its inner end, the cold finger carries a funnel 9 which pivots on a hook 10 carried by the finger. Immediately adjacent the funnel 9, the column has a collecting cup 11, a trap 12, a take-off tube 13, and a vent 14.

In fractional distillation procedures, it is customary to take off small portions of the condensate or distillate at timed intervals. To accomplish this, the funnel 9 has a glass enclosed permanent magnet 15. A magnet (not shown) placed adjacent to the magnet 15 but outside the apparatus is periodically energized and the resulting magnetic attraction pivots the funnel 9 about the hook 10 so that the spout of the funnel lies above the receiving cup 11. Any distillate in the funnel 9 at the time it is pivoted then flows into the receiving cup 11 and from there into the trap 12. After a sufficient amount of the distillate has been gathered into the trap 12, it flows off through the take-off tube 13. The vent 14 prevents siphoning of the distillate from the trap 12.

The distillation column 5 also has an expansion coil 16 adjacent its end which in turn is connected to the heating flask. This expansion coil provides for thermal expansion and contraction of the column within the apparatus.

Figure 4:
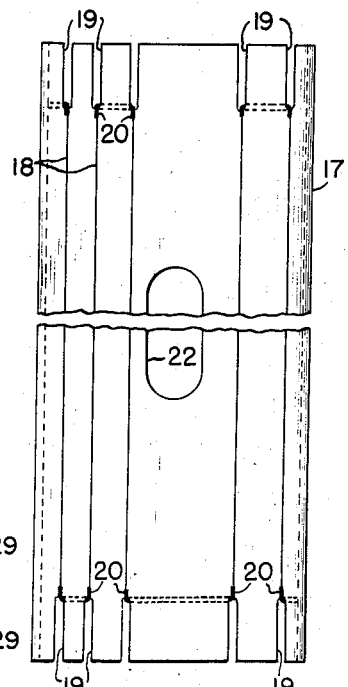
Figure 4 is an elevation view of a heating element used in my apparatus.

The apparatus so far described is conventional. In addition thereto, my distillation apparatus has a heating element comprising a tube 17 which surrounds the column 5 and extends substantially the entire length of the column. The tube 17 carries an electrical resistance wire 18 which extends back and forth between the ends of the tube, the individual laps being spaced around the periphery of the tube. The resistance wire is carried on the tube 17 by threading it through slots 19 cut in the ends of the tube as shown in Figure 4.

The resistance wires are insulated by a covering of glass cloth. In addition, the wires, where they pass through and around the slots 19 of the tube, have woven glass sleeving 20 to reduce the possibility of shorting the wires by a break in the glass cloth insulation. To further reduce the possibility of short-circuiting, the tube may be made of aluminum, the outer surface of which has been anodized to make it nonconducting.

Figure 2:
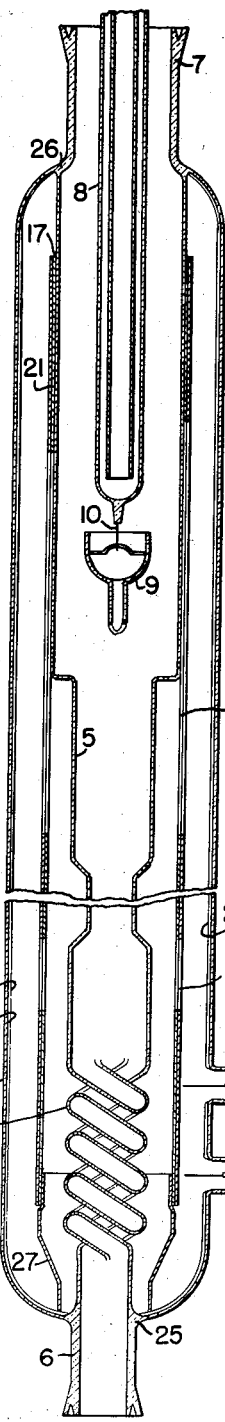
Figure 2 is also a central vertical section of the apparatus, the sections shown in Figures 1 and 2 being at right angles to each other.

The heating element used in my apparatus also has a metallic sleeve 21 which surrounds the tube 17 and the wire 18 and extends the full length of the tube 17. Preferably, the inner surface of the sleeve 21 is polished so that it is reflecting. The tube 17 and the sleeve 21 have short longitudinally extending slots 22 at intervals along their length, so that operations within the fractionating column can be observed. Both the tube and the sleeve also have a slot 23 which extends from their upper ends to a point below the take-off tube 13, so that the tube and the sleeve can be slipped over the column 5 past the take-off tube 13 and the vent 14. As shown in Figures 1 and 2 of the drawings, the heating element comprising the tube 17, the resistance wire 18, and the sleeve 21 surrounds the portion of the column 5 into which the cold finger 8 of the condensing unit extends.

Figure 3:
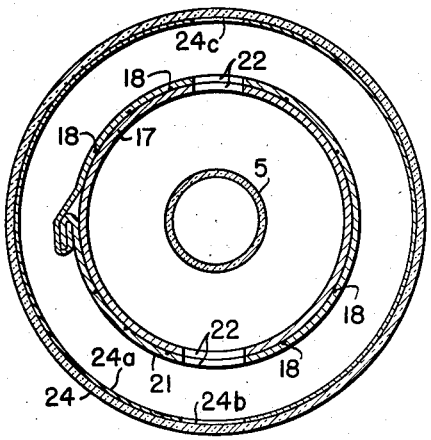
Figure 3 is a cross section along the lines III—III of Figure 1.

My distillation apparatus also includes a glass tube 24 which surrounds the entire length of the sleeve 21 and extends beyond both ends of the sleeve. At both ends, the tube 24 is reduced in diameter and sealed to the column 5, as at 25 and 26. A high vacuum is created within the tube 24 so that it acts as a vacuum jacket and maintains a high vacuum around the heating element. To decrease further the loss of heat from the heating element, I silver the inside surface of the tube 24 as shown at 24a in Figures 1, 2, and 3. There are gaps 24b and 24c in the silvering at opposite sides of the tube and these gaps are lined up with the slots 22 in the tube 17 and sleeve 21 when the apparatus is assembled so that action within the column 5 can be observed.

The jacket 24 also serves to support the heating element by means of an adapter 27, the upper end of which fits within the tube 17 and the lower end of which rests on the turned in portions of the tube 24 adjacent the column 5. The tube 24 also has seals 28 whereby wires 29 from a source of electric current (not shown) can be led to the resistance wire 18.

My distillation apparatus is highly effective for maintaining a very close control of temperature within the fractionating column 5 and for maintaining this temperature constant throughout the full length of the column. The current to the resistance wire may be adjusted so as to maintain the desired temperature within the column. Heat supplied by the resistance wire passes directly through the aluminum tube 17 to the column. The sleeve 21 which surrounds the wire assists in directing the heat to the column, because its inner surface reflects heat created by the wire back towards the tube 17 and thence to the column 5. The tube 24 which acts as a vacuum jacket maintains a high vacuum around the heating element 17 so little heat is lost from the heating element to the outside and, more important, ambient temperatures prevailing in the laboratory do not affect the operating conditions within the column.

As shown in Figures 1 and 2, the heating element is in contact with the portion of the fractionating column 5 into which the cold finger 8 of the condensing unit extends, and the tube 24 surrounds this same portion of the tube. The result is that no condensation of the distillate occurs on the upper inner walls of the column 5. All distillate is condensed on the cold finger 8 from whence it flows into the funnel 9. This greatly improves the efficiency of the operation. If the distillate condensed in other portions of the apparatus, say along the upper portions of the inner walls of the column 5, a considerably longer time would be required to accomplish any particular separation.

While I have described a present preferred embodiment of my invention, it is to be understood that it may be otherwise embodied within the scope of the appended claims.

I claim:

1. Fractional distillation apparatus comprising a fractionating column adapted to be secured to a heating flask at one end and to carry a condenser unit at the other end, a tube surrounding the column, an electrical resistance wire carried by the tube, the tube and wire extending substantially the full length of the column, and a jacket surrounding the column, tube, and wire and extending substantially the full length of the column and sealed at its ends to the column for enclosing the outer surface of the column, the tube, and the wire within the same space and for maintaining a vacuum in said space between the column and the jacket.

2. Fractional distillation apparatus comprising a fractionating column adapted to be secured to a heating flask at one end and to carry a condenser unit at the other end, said condenser having a cold finger extending into the column, a heating element surrounding the column and extending substantially the full length thereof and contacting the portion of the column into which the cold finger extends, and a jacket sealed at its ends to the column and surrounding and enclosing within one space the column and the heating element for maintaining a vacuum between the column and the jacket.

3. Fractional distillation apparatus comprising a fractionating column adapted to be secured to a heating flask at one end and to carry a condenser unit at the other end, a tube surrounding the column, an electrical resistance wire carried by the tube, a sleeve surrounding the tube and resistance wire, the tube, resistance wire, and sleeve extending substantially the full length of the column, and a jacket sealed at its ends to the column and enclosing within one space the column, tube, and sleeve for maintaining a vacuum between the column and the space.

4. Fractional distillation apparatus comprising a fractionating column adapted to be secured to a heating flask at one end and to carry a condenser unit at the other end, a metallic tube surrounding the column, an electrical resistance wire carried by the tube, a sleeve surrounding the tube and resistance wire, said sleeve having an inner reflecting surface, said tube, wire, and sleeve extending substantially the length of the wire, and a jacket enclosing the column, tube, and sleeve and sealed at its ends to the column for maintaining a vacuum between the column and the jacket.

References Cited in the file of this patent

UNITED STATES PATENTS

| | | |
|---|---|---|
| 424,047 | Butterfield et al. | Mar. 25, 1890 |
| 1,530,199 | Opperman | Mar. 17, 1925 |
| 1,604,972 | Clarke | Nov. 2, 1926 |
| 2,387,479 | Todd | Oct. 23, 1945 |
| 2,400,021 | Podbielniak | May 7, 1946 |
| 2,573,807 | Piros et al. | Nov. 6, 1951 |
| 2,608,528 | Piros et al. | Aug. 26, 1952 |

OTHER REFERENCES

"Fractionating Column for Use Under Diminished Pressure" by M. T. Bush and A. M. Schwartz. Industrial and Engineering Chemistry, Jan. 15, 1932, pgs. 142 and 143.

"Efficient and Versatile Laboratory Fractionation Column Assembly" by F. Todd. Industrial and Engineering Chemistry (Analytical edition) March 1945, pgs. 175–181, inclusive.

"Concentric-Tube Fractionating Columns," Donnell and Kennedy. Industrial and Engineering Chemistry, November 1950, pgs. 2327–2332, inclusive.